US007481104B2

(12) United States Patent
Schnaibel et al.

(10) Patent No.: US 7,481,104 B2
(45) Date of Patent: Jan. 27, 2009

(54) METHOD AND DEVICE FOR DIAGNOSING THE DYNAMIC CHARACTERISTICS OF A LAMBDA PROBE USED FOR THE LAMBDA REGULATION OF INDIVIDUAL CYLINDERS

(75) Inventors: Eberhard Schnaibel, Hemmingen (DE); Andreas Koring, Reutlingen (DE); Ruediger Deibert, Esslingen A.N. (DE); Michael Daetz, Tiddische (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 10/540,651

(22) PCT Filed: Dec. 19, 2003

(86) PCT No.: PCT/DE03/04250

§ 371 (c)(1),
(2), (4) Date: Feb. 7, 2006

(87) PCT Pub. No.: WO2004/059152

PCT Pub. Date: Jul. 15, 2004

(65) Prior Publication Data

US 2006/0170538 A1 Aug. 3, 2006

(30) Foreign Application Priority Data

Dec. 23, 2002 (DE) ................................ 102 60 721

(51) Int. Cl.
*G01M 15/00* (2006.01)

(52) U.S. Cl. .................................................... 73/114.73

(58) Field of Classification Search ................ 73/23.31, 73/23.32, 114.69, 114.71, 114.72, 114.73
See application file for complete search history.

(56) References Cited

U.S. PATENT DOCUMENTS

| | | | | |
|---|---|---|---|---|
| 5,317,868 | A * | 6/1994 | Blischke et al. | 60/274 |
| 6,167,754 | B1 * | 1/2001 | Koenders | 73/116 |
| 6,439,038 | B1 * | 8/2002 | Rosel et al. | 73/117.3 |
| 6,550,307 | B1 * | 4/2003 | Zhang et al. | 73/23.32 |
| 2003/0014967 | A1 * | 1/2003 | Daetz et al. | 60/285 |
| 2005/0145233 | A1 * | 7/2005 | Schneider et al. | 123/690 |
| 2007/0119242 | A1 * | 5/2007 | Buck et al. | 73/118.1 |

FOREIGN PATENT DOCUMENTS

| | | |
|---|---|---|
| DE | 42 36 008 | 4/1994 |
| DE | 197 37 840 | 3/1998 |
| DE | 197 34 073 | 11/1998 |
| DE | 197 33 107 | 2/1999 |
| DE | 197 34 072 | 2/1999 |
| DE | 38 16 520 | 11/1999 |
| DE | 199 03 721 | 7/2000 |
| DE | 101 28 969 | 12/2002 |
| DE | 102 06 402 | 4/2003 |
| DE | 101 61 901 | 6/2003 |

* cited by examiner

*Primary Examiner*—Eric S McCall
(74) *Attorney, Agent, or Firm*—Kenyon & Kenyon LLP

(57) ABSTRACT

A method for diagnosing the dynamic characteristics of a lambda sensor, which is used at least intermittently for a cylinder-individual lambda closed-loop control, which provides for at least one actuating variable of the lambda closed-loop control to be detected and compared to a specifiable maximum threshold, and, if the maximum threshold is exceeded, the dynamic response of the lambda sensor is deemed insufficient with respect to the usability for the cylinder-individual lambda closed-loop control.

10 Claims, 1 Drawing Sheet

METHOD AND DEVICE FOR DIAGNOSING THE DYNAMIC CHARACTERISTICS OF A LAMBDA PROBE USED FOR THE LAMBDA REGULATION OF INDIVIDUAL CYLINDERS

FIELD OF THE INVENTION

The exemplary embodiment and/or method of the present invention relates to a method and a device for diagnosing the dynamic characteristics of lambda sensors with respect to a cylinder-individual lambda closed-loop control.

BACKGROUND INFORMATION

For instance, a lambda closed-loop control in conjunction with a catalytic converter is currently the most effective exhaust-gas treatment method for the spark-ignition engine. Only in interaction with currently available ignition and injection systems is it possible to achieve very low exhaust values. Limit values for the engine exhaust gas are even mandated by law in most countries.

The use of a three-way catalytic converter, or selective catalytic converter, is especially effective. This type of catalytic converter is able to break down up to more than 98% of hydrocarbons, carbon monoxides and nitrogen oxides provided the engine is operated within a range of approximately 1% around the stoichiometric air-fuel ratio at lambda=1. In this context, lambda specifies the degree to which the actually present air-fuel mixture deviates from the lambda=1 value, which corresponds to a mass ratio of 14.7 kg air to 1 kg of gasoline that is theoretically required for complete combustion, i.e., lambda is the quotient of the supplied air mass and the theoretical air requirement.

As a general principle, lambda closed-loop control measures the particular exhaust gas, the supplied fuel quantity being immediately corrected according to the measuring result via the injection system, fox instance. Used as measuring probe is a lambda sensor, which is able to measure a steady lambda signal around lambda=1 and in this way supplies a signal that indicates whether the mixture is richer or leaner than lambda=1.

As may be known, the effect of these lambda sensors is based on the principle of a galvanic oxygen concentration cell having a solid state electrolyte.

Furthermore, a cylinder-individual lambda closed-loop control may be used to improve the exhaust gas if the lambda sensor, owing to its dynamic properties, is able to track lambda fluctuations in the exhaust-gas flow caused by cylinder-individual lambda differences at the installation location of the sensor.

Due to a temporally high-resolution evaluation of the signal coming from the lambda sensor, it is possible to conclude from the composite lambda signal to the lambda of the individual engine cylinders whose exhaust gas is conveyed to the installation location of the sensor. In this way, cylinder-individual lambda differences may be corrected and the exhaust-gas result or, at the very least, the exhaust-gas stability be improved.

The dynamic characteristics of a lambda sensor in new condition is in most cases adequate within a selected operating range. Nevertheless, in the event that the dynamic characteristics of the sensor change, to the effect that cylinder-individual lambda values are unable to be resolved since the response times of the sensor are increasing, the closed-loop lambda control will not intervene although lambda fluctuations are indeed present in the exhaust gas. Causes of a reduced dynamic performance of the sensor are, for instance, constrictions in the protective tube orifices of the sensor or contamination of function-controlling sensor ceramic parts of the solid state electrolyte as a result of deposits. In broad-band sensors, contamination of the diffusion barrier provided there may also play a part. In the worst case, a non-functioning cylinder-individual lambda closed-loop control will result in non-compliance with the mentioned exhaust-gas limit values mandated by law. In this case, the changed dynamic characteristics of the lambda sensor must be indicated by a control light, for example.

SUMMARY OF THE INVENTION

The exemplary embodiment and/or method of the present invention is therefore based on the objective of providing a method and a device of the type mentioned in the introduction, which allow a reliable diagnosis of the dynamic characteristics of a lambda sensor with respect to a cylinder-individual closed-loop lambda control.

In a method and a device for diagnosis of the aforementioned type this objective is achieved by the features of the respective independent claims.

The method according to the present invention in particular provides that at least one actuating variable of the closed-loop lambda control be detected and compared to a specifiable maximum threshold, and in the event that the maximum threshold is exceeded, that the dynamic performance of the lambda sensor be considered insufficient with respect to usability for the cylinder-individual closed-loop lambda control.

In a first variant of the exemplary embodiment and/or method of the present invention, the dynamic characteristics of the lambda sensor are detected by the cylinder-individual control itself. This is based on the thought that the method of operation of individual cylinder-individual controllers diverges when the dynamic properties are insufficient and the associated actuating variables, namely one or more actuating variables, exceed a specifiable maximum threshold value.

In a second variant according to the exemplary embodiment and/or method of the present invention, the dynamic response of the lambda sensor is detected with the aid of a test function, i.e., by an initiated interference or detuning of the instantaneous lambda value. The test function may be implemented on a one-time basis, on an intermittent periodical basis or in an event-triggered manner.

The specifiable maximum threshold for a cylinder-individual controller may be exceeded, for instance, when the controller is active and the value of the respective actuating variable is higher than the specifiable amount or the actuating variable is unable to be increased further due to its structure. In this case, the dynamic properties of the lambda sensor will be deemed insufficient with respect to the usability for the cylinder-individual closed-loop lambda control.

Furthermore, the exemplary embodiment and/or method of the present invention relates to a diagnostic device, which operates according to the method of the present invention.

BRIEF DESCRIPTION OF THE DRAWINGS

The FIGURE shows an exemplary diagnosis method according to the present invention on the basis of a flow chart.

DETAILED DESCRIPTION

Figure 1:
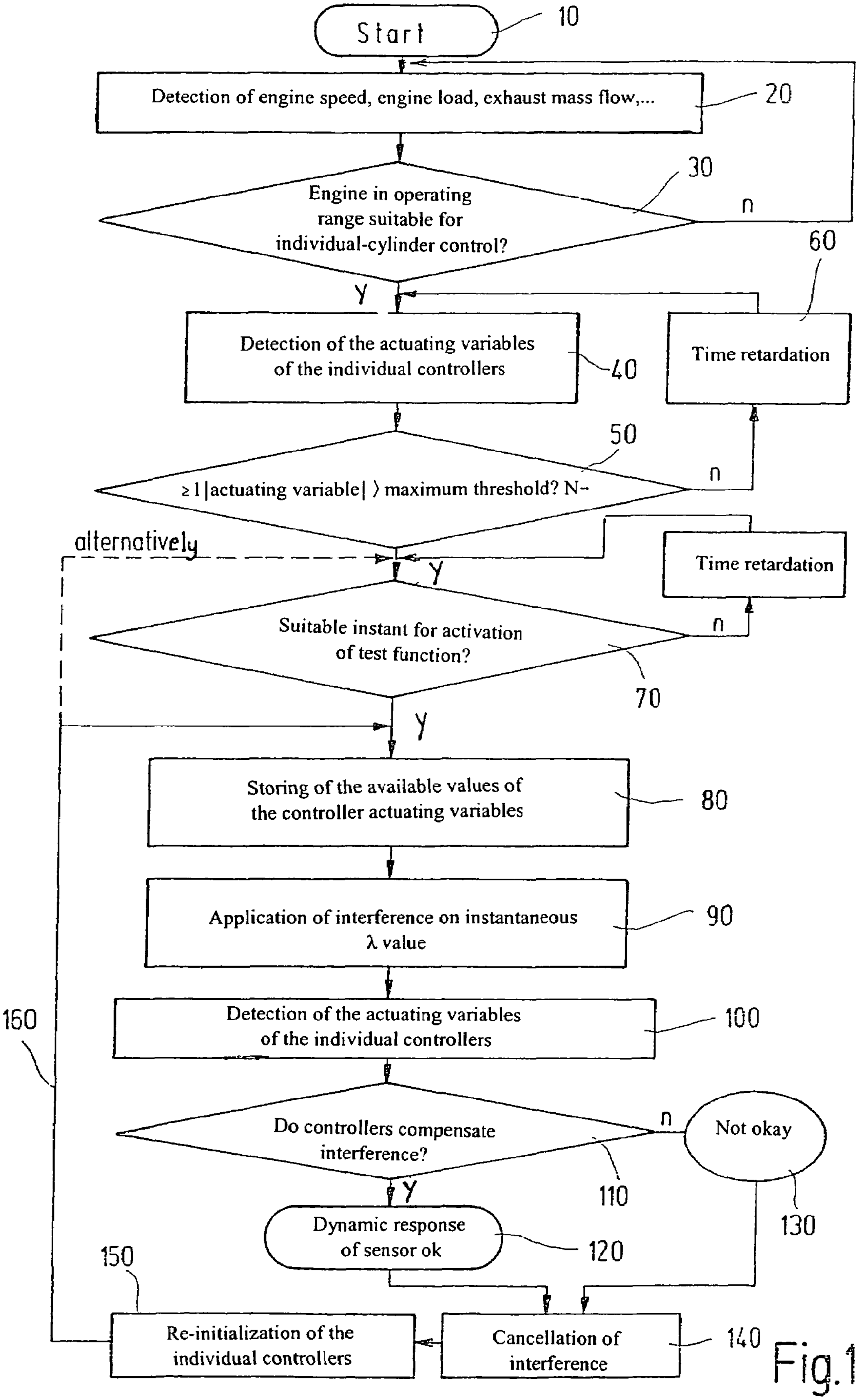

The following diagnostic routine for detecting the usability or non-usability of a lambda sensor of a spark-ignition engine, which is described in the following with the aid of the FIGURE, may be implemented only during the time when a cylinder-individual control having individual controllers is active. Depending on the strategy, the test function described hereinafter will be executed once or several times and the results of the tests analyzed only for as long as the test function is active.

Following start 10 of the routine, the engine speed and/or the engine load and/or exhaust-gas mass flow 20 are/is ascertained first. On the basis of these data, it is determined in step 30 whether the engine is in an operating state that is suitable for the cylinder-individual control in the first place, and thus suitable for a detection of the dynamic properties of the lambda sensor. If this is not the case, a return to the beginning of the routine takes place in the form of a loop. In the other case, the actuating variables of the individual controllers are monitored 40 and, following detection of the actuating variables, it is also checked 50 whether the amount of at least one of the actuating variables exceeds a specifiable maximum threshold. If this is not the case, a return to step 40 takes place, possibly including a delay.

If one or several actuating variable(s) of the individual controllers exceed(s) a specifiable maximum threshold in its/their amount, it is assumed that the dynamic characteristics of the lambda sensor are insufficient.

In a next step 70 it is ascertained whether a suitable instant for activating the test function is present. If this is not the case, this test 70 will be repeated in a loop, possibly also by including a delay stage.

Otherwise, the test routine begins in that the instantaneously present values of the actuating variables of the individual controllers are buffer-stored 80. Subsequently, an interference is applied 90 to the instantaneously ascertained lambda values and the actuating variables of the individual controllers monitored or recorded 100.

It is then checked 110 whether the controller(s) is/are able to compensate for the interference. If this is the case, a positive signal will be output 120, if appropriate, to the effect that the dynamic response of the sensor is adequate. Otherwise, it will be assumed that the dynamic requirements are not met and a corresponding negative signal will be output 130.

Finally, the interference is reversed 140 and a re-initialization 150 of the individual controllers takes place using the buffer-stored values. Then, another interference is applied, as indicated by return 160.

The described procedure or routine is implemented repeatedly, if appropriate, so as to be able to optimize the actuating variables in an iterative manner, so to speak, or in a stepwise manner.

The dynamic properties of the lambda sensor with respect to the cylinder-individual control are therefore ascertained with the aid of the controller function itself and/or the described active test function. In a suitable driving situation, the lambda of a cylinder is intentionally detuned by varying the cylinder-individual fuel metering by a previously defined amount x. When the cylinder-individual control is active, this cylinder detuning must be reflected in the associated cylinder-individual actuating variable of the cylinder-individual control as an additional offset of approximately the same magnitude as the detuning. If the resultant change in the actuating variable amounts only to a portion y of the stimulated cylinder detuning, this indicates that the lambda sensor is no longer able to fully follow the cylinder-individual fluctuations because of a reduced dynamic response. If portion y falls below a specifiable threshold z, i.e., an exhaust-gas relevant residual fault x-z can no longer be adjusted, a fault signal must be output. The resulting exhaust-gas loss is of no consequence in this case.

In the case of a satisfactory test result, i.e., the sensor dynamics of the cylinder-individual lambda control are considered adequate since the detuning is completely or virtually completely compensated, the described test function has no detrimental effect on the exhaust gas. In addition, once a test has been concluded, the cylinder detuning will be set back to the initial state, as described.

It should be noted that a possibly detected change in the dynamic characteristics of the lambda sensor is not relevant for the remaining functions of the engine control that evaluate the lambda sensor signal, and that these must therefore be monitored separately.

The exemplary embodiment and/or method of the present invention may be implemented either as hardware or in the form of a control program as part of the engine control.

What is claimed is:

1. A method for diagnosing a dynamic characteristics of a lambda sensor, which is used at least intermittently for a cylinder-individual lambda control, the method comprising:

detecting at least one actuating variable of the lambda control;

comparing the at least one actuating variable to a specifiable maximum threshold; and if the maximum threshold is exceeded, determining that a dynamic response of the lambda sensor is insufficient with respect to usability for the cylinder-individual lambda control;

wherein:

the value of lambda of at least one cylinder is detuned by a specifiable value; and whether the detuning by the specifiable value is reflected as an offset or a factor in an actuating variable of a particular controller of the lambda control is ascertained.

2. The method of claim 1 wherein the value of lambda is detuned by variation of the cylinder-individual fuel metering.

3. The method of claim 1 wherein, whether a difference or an absolute value of the difference between detuning and offset is smaller than the specifiable maximum threshold is ascertained.

4. The method of claim 3, wherein the value of lambda is detuned by variation of the cylinder-individual fuel metering.

5. The method of claim 3, further comprising:

detecting a suitable operating range for the cylinder-individual lambda control;

monitoring the actuating variables of the individual lambda controllers; and if at least one of the actuating variables exceeds its maximum amount, detecting a suitable instant for implementing the following:

buffer-storing the actuating variables of the individual lambda controllers;

detuning the value of lambda of at least one cylinder by the specifiable value;

monitoring the actuating variables of the individual lambda controllers; and determining whether the lambda controllers are able to compensate the detuning of the value of lambda, and if the lambda controllers are able to do so, cancellating the detuning, and re-initializing the individual lambda co oilers by the buffer-stored actuating variables; and otherwise, outputting a fault signal.

6. A diagnosis device for diagnosing a dynamic characteristics of a lambda sensor, which is used at least intermittently for a cylinder-individual lambda control, comprising:

a detecting arrangement to detect at least one actuating variable of the lambda control;

a comparing arrangement to compare the at least one actuating variable to a specifiable maximum threshold; and an arrangement to determine, if the maximum threshold is exceeded, that a dynamic response of the lambda sensor is insufficient with respect to usability for the cylinder-individual lambda control;

wherein:

the value of lambda of at least one cylinder is detuned by a specifiable value; and whether the detuning by the specifiable value is reflected as an offset or a factor in an actuating variable of a particular controller of the lambda control is ascertained.

7. The diagnosis device of claim 6, wherein the value of lambda is detuned by variation of the cylinder-individual fuel metering.

8. The diagnosis device of claim 6, wherein, whether a difference or an absolute value of the difference between detuning and offset is smaller than the specifiable maximum threshold is ascertained.

9. The diagnosis device of claim 8, wherein the value of lambda is detuned by variation of the cylinder-individual fuel metering.

10. The diagnosis device of claim 8, further comprising:

a detecting arrangement to detect a suitable operating range for the cylinder-individual lambda control;

a monitoring arrangement to monitor the actuating variables of the individual lambda controllers; and a detecting arrangement to detect, if at least one of the actuating variables exceeds its maximum amount, a suitable instant for implementing the following:

buffer-storing the actuating variables of the individual lambda controllers;

detuning the value of lambda of at least one cylinder by the specifiable value;

monitoring the actuating variables of the individual lambda controllers; and determining whether the lambda controllers are able to compensate the detuning of the value of lambda, and if the lambda controllers are able to do so, cancellating the detuning, and re-initializing the individual lambda controllers by the buffer-stored actuating variables; and otherwise, outputting a fault signal.

* * * * *